A. C. & H. E. THORPE.
STAFF HOLDER.
APPLICATION FILED MAY 23, 1913.
1,096,869.
Patented May 19, 1914.
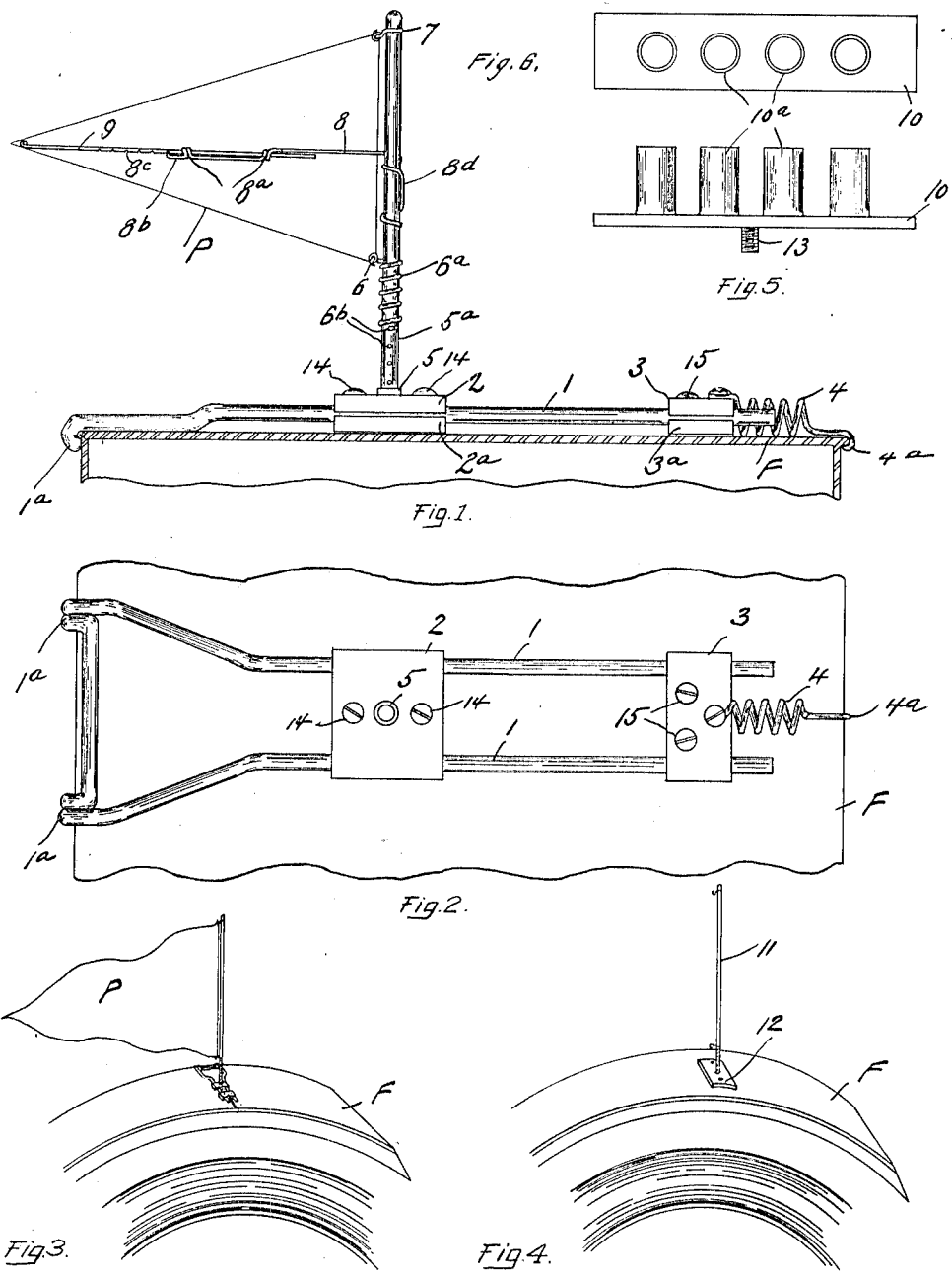

UNITED STATES PATENT OFFICE.

ARTHUR C. THORPE AND HENRY E. THORPE, OF STOCKTON, CALIFORNIA.

STAFF-HOLDER.

1,096,869.  Specification of Letters Patent.  Patented May 19, 1914.

Application filed May 23, 1913. Serial No. 769,455.

*To all whom it may concern:*

Be it known that we, ARTHUR C. THORPE and HENRY E. THORPE, citizens of the United States, residing at Stockton, in the county of San Joaquin and State of California, have invented certain new and useful Improvements in Staff-Holders, of which the following is a specification.

The pennant holder which is the subject-matter of the present application for patent is designed more particularly for attachment to the fender of automobiles, and its object is to provide a holder of improved construction which can be readily applied to the fender, or removed therefrom.

The invention also has for its object to provide a novel and improved device for holding the pennant stretched.

In order that the invention may be better understood, reference is had to the accompanying drawing forming a part of this specification, in which drawing—

Figure 1 is a cross-section of an automobile fender with the holder applied thereto. Fig. 2 is a plan view of the holder. Fig. 3 is a perspective view of the holder in place on the fender. Fig. 4 is a perspective view showing a modification. Fig. 5 is an elevation showing a modified form of holder, and Fig. 6 is a plan view thereof.

In the drawing F denotes one of the wheel fenders of an automobile to which the pennant holder is applied. The holder has an attaching part comprising a pair of rods or stout wires 1 which are arranged in spaced parallel relation and extend across the top of the fender. The rods are formed at one end into a hook $1^a$ which extends over one edge of the fender. The other edge of the fender is engaged by the hooked end $4^a$ of a tension spring 4 anchored to a block 3, between which and a similar block $3^a$ the rods are clamped by screws 15 connecting the blocks. Upon loosening the screws, the blocks are released and they may then be slid along the rods to vary the tension of the spring, after which the blocks are made fast by drawing the same together by means of the screws. Thus the spring may be adjusted according to the width of the fender, and the device is applicable to different fender widths. The spring tightly clamps the device in position on the fender, and at the same time it can be readily removed or replaced. The opposite faces of the blocks are grooved to form seats for the rods. On the rods 1 are also mounted blocks 2 and $2^a$, the rods fitting between said blocks and the latter being clamped to the rods by screws 14 in the same manner as the blocks 3 and $3^a$. The top block 2 has a top socket 5 into which is screwed the staff $5^a$ of the pennant P, the staff being thus readily removable. The blocks are adjustable along the rods so that the pennant may be positioned as desired.

At the top of the staff $5^a$ is a hook 7 which passes through an eye in the top of the pennant, and at the bottom of the latter is an eye into which extends a hook 6 formed at one end of a spring $6^a$ which is coiled around the staff. The other end of the spring has a bend which extends into an aperture $6^b$ in the staff. A series of apertures is provided so that the tension of the spring may be varied.

The hooks 6 and 7 serve to hold the pennant to the staff $5^a$, and it is stretched, and held taut and straight by the action of the spring $6^a$. A device is also provided for holding the pennant spread or unfurled, said device comprising a rod which is in two sections, indicated at 8 and 9, respectively, said sections being slidably connected so that they may be lengthened or shortened according to the length of the pennant. The outer end of the section 9 is connected to the extremity of the pennant, and its inner end is slidably mounted in loops $8^a$ formed in the section 8. The outer end of the section 8 has a tooth $8^b$ which enters one of a series of notches $8^c$ in the section 9, whereby the two sections are locked in adjusted position. The section 8 is attached to the staff by being twisted around the same as indicated at $8^d$.

Upon removing the staff $5^a$, the holder shown in Fig. 5 can be substituted therefor, said holder being designed for holding a number of flags. The holder comprises a base plate 10 having at the top a number of sockets $10^a$ to receive the staffs of the flags, and from the bottom of the base plate extends a threaded stem 13 which is adapted to be screwed into the socket 5, whereby the holder is mounted on the block 2.

Fig. 4 shows a pennant holder which is permanently secured to the fender, said holder comprising a plate 12 which is riveted to the fender and has a socket to hold the staff 11 of the pennant or flag.

We claim:

1. A staff holder comprising rods having an edge-engaging hook at one end, blocks between which the other ends of the rods extend and are clamped, a spring anchored to the blocks and having at its outer end an edge-engaging hook, and a block adjustably mounted on the rods and having a staff-holding socket.

2. A staff holder comprising rods having an edge-engaging hook at one end, a block adjustably clamped to the other end of the rods, a spring anchored to the block and having at its outer end an edge-engaging hook, and a block mounted on the rods and having a staff-holding socket.

In testimony whereof we affix our signatures in presence of two witnesses.

ARTHUR C. THORPE.
HENRY E. THORPE.

Witnesses:
CLIFTON M. KIZER,
CHAS. H. YOUNG.